(12) United States Patent
Aloisio et al.

(10) Patent No.: US 10,878,018 B1
(45) Date of Patent: Dec. 29, 2020

(54) SYSTEMS AND METHODS FOR CLASSIFICATION OF DATA STREAMS

(71) Applicant: ARCHITECTURE TECHNOLOGY CORPORATION, Eden Prairie, MN (US)

(72) Inventors: Scott Aloisio, Ithaca, NY (US); Paul Nicotera, Ithaca, NY (US)

(73) Assignee: Architecture Technology Corporation, Eden Prairie, MN (US)

( * ) Notice: Subject to any disclaimer, the term of this patent is extended or adjusted under 35 U.S.C. 154(b) by 171 days.

(21) Appl. No.: 16/130,648

(22) Filed: Sep. 13, 2018

(51) Int. Cl.
| G06F 16/35 | (2019.01) |
| G06F 16/84 | (2019.01) |
| G06F 16/907 | (2019.01) |
| G06F 16/951 | (2019.01) |
| G06F 40/221 | (2020.01) |

(52) U.S. Cl.
CPC .............. *G06F 16/35* (2019.01); *G06F 16/84* (2019.01); *G06F 16/907* (2019.01); *G06F 16/951* (2019.01); *G06F 40/221* (2020.01)

(58) Field of Classification Search
CPC .... G06F 16/215; G06F 16/1752; G06F 16/11; G06F 16/1727; G06F 16/1834
USPC ....................................................... 707/737
See application file for complete search history.

(56) References Cited

U.S. PATENT DOCUMENTS

| 2009/0164416 | A1* | 6/2009 | Guha | G06F 16/31 |
| 2013/0234933 | A1* | 9/2013 | Reitan | G06T 13/40 |
| | | | | 345/156 |
| 2014/0310499 | A1* | 10/2014 | Sundararaman | G06F 16/2308 |
| | | | | 711/203 |
| 2016/0065599 | A1* | 3/2016 | Hovor | H04L 63/1416 |
| | | | | 726/23 |
| 2018/0234310 | A1* | 8/2018 | Ingalls | H04L 41/12 |

OTHER PUBLICATIONS

ATC-NY, N173-145-0003, Knoller, Oct. 25, 2017, pp. 1-20.

* cited by examiner

*Primary Examiner* — James Trujillo
*Assistant Examiner* — Fariborz Khoshnoodi
(74) *Attorney, Agent, or Firm* — Foley & Lardner LLP

(57) ABSTRACT

Disclosed herein are embodiments of systems, methods, and apparatus that execute classification techniques to enable high-quality analysis of ingest data by interpreting and categorizing disparate data points of the ingest data. The execution of the classification techniques leads to isolation of intrinsic properties of each data point to represent the essence of what the overall ingest data indicates. The classification techniques further enables classification of the ingest data, which is unencumbered by any ingest data format changes, such as ordering of data components, encoding, or properties associated with the ingest data that are likely to change without altering meaning conveyed by the ingest data.

20 Claims, 3 Drawing Sheets

SYSTEMS AND METHODS FOR CLASSIFICATION OF DATA STREAMS

TECHNICAL FIELD

This application relates generally to field of data analysis, and more specifically to methods and systems for classification and processing of data streams.

BACKGROUND

In data science applications, data which is incomplete, fragmented, inconsistent, or otherwise misleading is considered to be low-quality data. There are many causes for generation of the low-quality data. For instance, various data analysis systems that perform data examination frequently depend on a consistent format of the data obtained from sensors and other data generation sources. When data generation sources change format, the data analysis systems which consume the data generated by the data generation source must adapt to the new format or risk misinterpreting the data examination results. In some cases, false information will be steadily supplied to the data analysis system without any clear indication of failure. Accordingly, the use of low-quality data is likely to lead to incorrect, misguided, and often dangerous conclusions for users that depend on results of the data analysis systems.

Recent improvements in data processing capabilities of data analysis systems due to better computing capabilities has made it possible to account for a larger collection of data for analysis. For example, CPU performance, the use of heterogeneous computing systems such as GPUs and FPGAs, inexpensive data storage, and improving sensor capabilities of data analysis systems have led to better data processing and analysis. However, it has been learned that all of these advanced hardware and software features of the data analysis systems do not make it easier to manage large sets of low-quality data and generate meaningful conclusions from said data, because only high-quality data leads to meaningful conclusions, and flawed and low-quality data only results in opaquely incorrect and misleading results.

Another problem of conventional data analysis systems with big data ingest is the large volumes of data that must be processed and categorized within some bounded computational budget. The volume of data may be highly variable, causing frequent time windows during which more computations must take place without prior warning. In light of an expected exponential increase in data availability, data processing solutions are needed that conform to and even take advantage of increased data volume into the future. In such circumstances, maintaining scalability of compute resources provides one way to accommodate greater computing demand to process and analyze large volumes of data, but often requires special computing constraints. For example, to achieve scalability by configuring hardware resources to be compatible and functional when scaled up or down, performance achieved by configuring hardware resources individually may have to be compromised. Furthermore, adding more hardware resources may hit diminishing returns in performance.

Another challenging aspect of conventional data analysis systems relates to classification of ingested data prior to processing and analyses of the data. Classification of ingested data refers to organizing, grouping, and categorizing of the ingested data. For example, an ingest data point related to weather should be categorized as a weather related data point and should be grouped with other weather related data points. However, due to the variability of data (e.g., data with different formats), classification becomes technically challenging. For instance, a first ingest data point related to weather may be in a first format and a second ingest data point while being related to the weather may be in a second format. The first and the second format while containing related data points may be incompatible with each other. Thus, due to all of the aforementioned problems in conventional data analysis systems analyzing large and disparate data sources, it is difficult to determine when noteworthy trends are happening in data versus artificial anomalies in the collection of the data.

SUMMARY

What is therefore desired are systems and methods that execute classification techniques to enable high-quality analysis of ingest data by interpreting and categorizing disparate data points of the ingest data. The execution of the classification techniques leads to isolation of intrinsic properties of each data point to represent the essence of what the overall data indicates. Accordingly, the classification techniques described herein enables classification of data, which is unencumbered by any data format changes, such as ordering of data components, encoding, or any other properties associated with the data that are likely to change without altering meaning conveyed by the data. Therefore, even if a first ingest data point and a second ingest data point containing related data are in different formats, a computer using the embodiments herein may identify the related data and consequently group the first and the second ingest data points together.

In an embodiment, a computer-implemented method comprises receiving, by a computer, a first unstructured data stream from a first data source and a second unstructured data stream from a second data source; mapping, by the computer, metadata of the first unstructured data stream to a first stored data stream format based on a comparison of the metadata of the first unstructured data stream to a plurality of stored data stream formats; mapping, by the computer, metadata of the second unstructured data to a second stored data stream format of the metadata of the second unstructured data stream to the plurality of stored data stream formats; recursively parsing, by the computer based on the first stored data stream format, a plurality of data components in the first data stream to retrieve a first set of atomic level data points; recursively parsing, by the computer based on the second stored data stream format, a plurality of data components in the second data stream to retrieve a second set of atomic level data points; clustering, by the computer, the first and second set of atomic level data points to generate a first cluster of atomic level data points with a common attribute; and storing, by the computer, the first cluster of atomic level data points based on the common attribute in a database, such that data from the first and second data sources is accessed in a source-agnostic way.

In another embodiment, a system comprises a non-transitory storage medium configured to store a database; a processor configured to: receive a first unstructured data stream from a first data source and a second unstructured data stream from a second data source; map metadata of the first unstructured data stream to a first stored data stream format based on a comparison of the metadata of the first unstructured data stream to a plurality of stored data stream formats; map metadata of the second unstructured data to a second stored data stream format of the metadata of the second unstructured data stream to the plurality of stored data stream formats; recursively parse based on the first stored data stream format, a plurality of data components in the first data stream to retrieve a first set of atomic level data points; recursively parse based on the second stored data stream format, a plurality of data components in the second data stream to retrieve a second set of atomic level data points; cluster the first and second set of atomic level data points to generate a first cluster of atomic level data points with a common attribute; and store the first cluster of atomic level data points using a metadata based on the common attribute in the database, such that data from the first and second data sources is accessed in a source-agnostic way.

BRIEF DESCRIPTION OF THE DRAWINGS

The accompanying drawings constitute a part of this specification and illustrate embodiments of the subject matter disclosed herein.

DETAILED DESCRIPTION

Figure 1A:
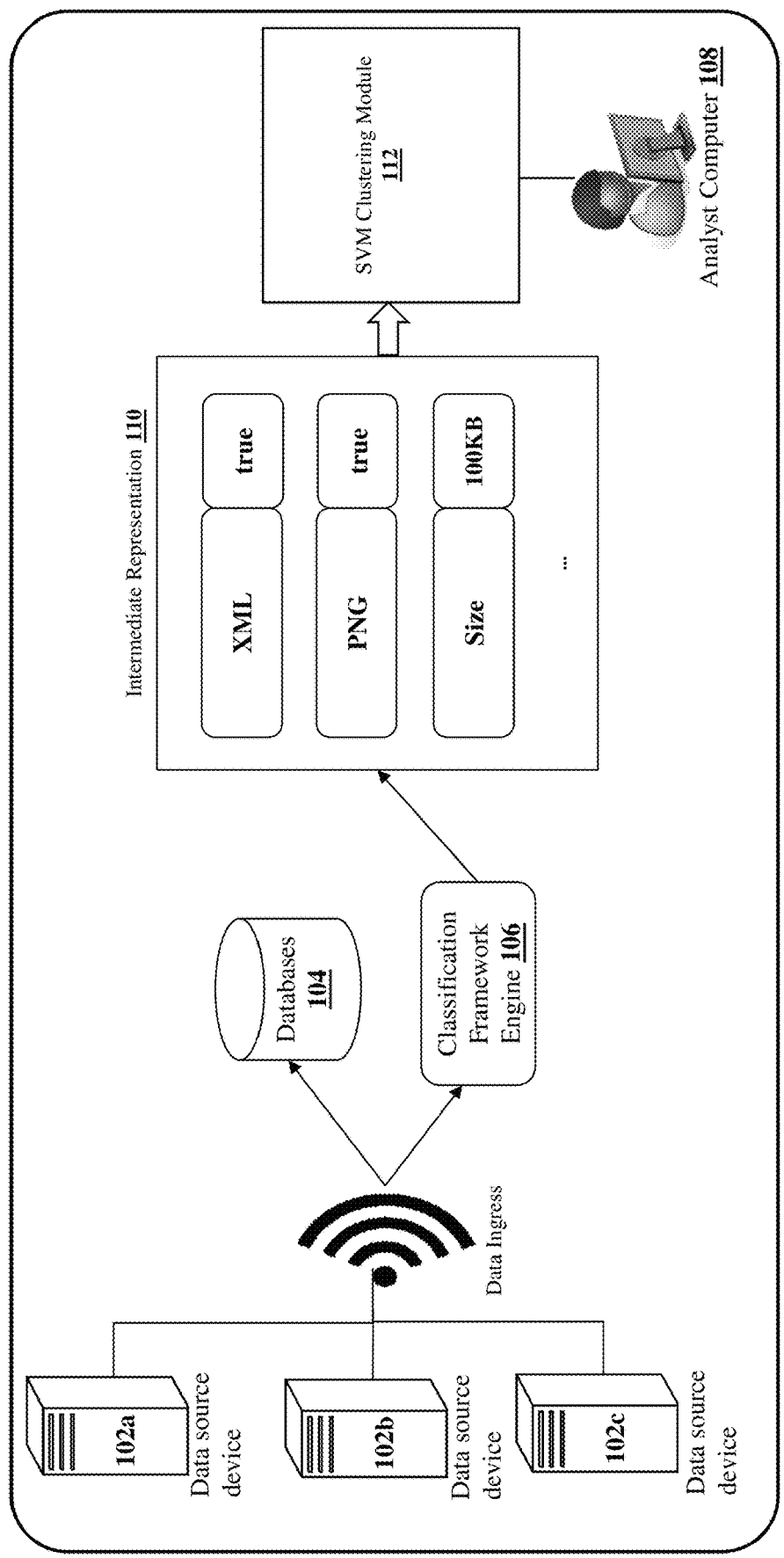
FIG. 1A illustrates an architecture of a system for classification of ingest data, according to an embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Systems and methods execute programs to parse and de-serialize all unstructured data received from multiple data sources, and thereby identifying meaningful components of the unstructured data. The execution of the programs may further generate relevant metadata, both surface level data and substantive data, and storing the metadata in form of a structured object. The metadata may be generated through execution of a series of increasingly introspective operations, which are easily distributed across multiple computing resources of the system. The generated object is then compared with training data through high-dimensional clustering, and is categorized according to its intrinsic properties. The generated data object presents opportunities for rapid and meaningful classification of all ingest data. A cluster of data is then generated, which may represent data sources, and be operated on with a consistent set of operations. Thus, the data is maintained in a clean and consistent way, and thereby simplifying data processing, accommodating a wider variety of data sources, and reducing waste by organization of the data.

FIG. 1A illustrates an architecture of a system 100 for classification of ingest data. The system 100 may include a plurality of data source devices 102 (such as a first data source device 102a, a second data source device 102b, and a third data source device 102c), a database 104, a classification framework engine 106, and an analyst computer 108. The plurality of data source devices 102, the database 104, the classification framework engine 106, and the analyst computer 108 are connected to each other through a network. The examples of the network may include, but are not limited to, private or public LAN, WLAN, MAN, WAN, and the Internet. The network may include both wired and wireless communications according to one or more standards and/or via one or more transport mediums. The communication over the network may be performed in accordance with various communication protocols such as Transmission Control Protocol and Internet Protocol (TCP/IP), User Datagram Protocol (UDP), and IEEE communication protocols. In one example, the network may include wireless communications according to Bluetooth specification sets, or another standard or proprietary wireless communication protocol. In another example, the network may also include communications over a cellular network, including, e.g. a GSM (Global System for Mobile Communications), CDMA (Code Division Multiple Access), EDGE (Enhanced Data for Global Evolution) network.

In operation, a plurality of data source devices 102 may generate and/or capture a plurality of unstructured data streams containing various data fields. The plurality of unstructured data streams may be text or non-text, without a format or explicit dimensions or a data structure usable by a computer program on the data source devices 102. For example, the plurality of unstructured data streams in the text form can be files, websites, emails, blogs, reports, etc., and unstructured data in the non-text form can be audio, video, images, etc. The unstructured data streams may be stored into a database 104 by the plurality of data source devices 102. A computer, which either is a part of or associated to a classification framework engine 106, may then perform various processes on the plurality of unstructured data streams. For instance, the computer may first map metadata of the plurality of unstructured data streams to a plurality of stored data stream formats based on a comparison of the metadata of the plurality of unstructured data streams to the plurality of stored data stream formats. Upon completion of the mapping process, the computer may then recursively parse, based on the plurality of stored data stream formats, a plurality of data components in the plurality of data streams to retrieve multiple sets of atomic level data points. A clustering process may then be executed to cluster each set of atomic level data points to generate a cluster of atomic level data points with a common attribute. The cluster of atomic level data points is then stored in a database using metadata based on the common attribute.

A data source device 102 may be any computing device comprising a processor and non-transitory machine-readable storage medium and capable of performing the various tasks and processes described herein during execution. A task refers to a piece of work, an activity, an action, a job, an instruction, or an assignment to be performed. Non-limiting examples of the data source 102 may include a desktop computer, a server computer, a laptop computer, a tablet computer, and the like. For ease of explanation, FIG. 1A shows three computing devices functioning as the data sources such as a first data source device 102a, a second data source device 102b, and a third data source device 102c, however, it should be appreciated that some embodiments may comprise any number of data sources capable of producing data and performing the various tasks described herein.

A data source device 102 may be a source of unstructured data. In some embodiments, a data source device 102 may be a source of structured data. In some embodiments, a data source device 102 may be a source of both structured data and unstructured data. Examples of data sources running on the data source devices 102 may include, but are not limited to, content providers that supply information over a network, such as company websites, weather websites, Yahoo®, Google™, Twitter™, YouTube™, and news websites.

In some embodiments, unstructured data may include tables, multi-dimensional arrays, objects, and other data structures. In some embodiments, the unstructured data may include data that is not structured for storage in rows and columns associated with a table. Other exemplary unstructured data may include World Wide Web (Web) pages, image files, presentations, emails, spreadsheets, audio files, video files, word processor documents, electronic documents, and other unstructured data. In some embodiments, the data source device 102 may capture unstructured data from a variety of suitable sources. For example, the data source device 102 may capture the unstructured data from various email servers and websites. Other exemplary suitable sources may include, but not limited to, web crawlers, content addressed storage systems, enterprise content management systems, business performance management systems, other management systems, enterprise information systems, enterprise information integration, database backup systems, video/audio streaming servers, customer relationship management software, and other suitable sources. The unstructured data may be generated and/or captured by any suitable manner. For example, in one embodiment, capture can include copying unstructured data from a source. In other words, a snapshot of unstructured data may be taken from the source. In another exemplary embodiment, capture can include receiving unstructured data from a source.

In some embodiments, structured data may refer to data that is structured for storage in data structures associated with the system 100. For example, the structured data may refer to the data that is structured for storage in rows and columns associated with a table. Exemplary structured data may include a collection of data records. Another exemplary structured data may include portions of data that may be queried using programming languages, such as Structured Query Language (SQL) and other database management system programming languages. In some embodiments, the data source device 102 may capture structured data from a variety of suitable sources. For instance, in the data source device 102 may capture structured data from websites.

A classification framework engine 106 may be associated to one or more processors and/or microprocessors. The one or more processors may be coupled to a memory. The microprocessor includes suitable logic, circuitry, and/or interfaces that are operable to execute one or more instructions stored in the memory to perform predetermined operations. The microprocessor may be implemented using one or more microprocessor technologies known in the art. Examples of the microprocessor include, but are not limited to, an x86 microprocessor, an ARM microprocessor, a Reduced Instruction Set Computing (RISC) microprocessor, an Application-Specific Integrated Circuit (ASIC) microprocessor, a Complex Instruction Set Computing (CISC) microprocessor, or any other microprocessor.

The classification framework engine 106 may receive data (such as unstructured data or structured data) from multiple data source devices 102. In some embodiments, the multiple data source devices 102 may transmit the data to the classification framework engine 106. In some embodiments, the classification framework engine 106 may extract and/or capture the data from the multiple data source devices 102. In addition to capturing data from the multiple data source devices 102 such as a server, the classification framework engine 106 can capture data from the World Wide Web and web application servers. To capture data from the Web, in one embodiment, the classification framework engine 106 may use a web crawler engine to automatically browse the Web and to capture web pages, which can include structured data and unstructured data. The web crawler engine may include any suitable web crawlers such as PolyBot, WebRACE, Web Information Retrieval Environment (WIRE), Internet Archive Crawler, and other web crawlers. In some embodiments, the classification framework engine 106 may use a document gathering engine, which can capture additional data from a variety of suitable data source devices 102 such as data warehouses, application servers (e.g., enterprise application servers and Web application servers), file systems, and other sources.

Upon receiving the data from the multiple data source devices 102, the classification framework engine 106 may tag, standardize, and normalize the unstructured data. In one instance, the classification framework engine 106 may standardize and/or normalize the unstructured data into a common format. The classification framework engine 106 may standardize and/or normalize the unstructured data into a format recognizable and/or compatible with a number of resources. In some embodiments, the classification framework engine 106 may choose a single data resource and standardize and/or normalize all of the data in accordance with the selected data resource. In some embodiments, the classification framework engine 106 may be associated with a data normalizer, which may convert the data into a format that can be understood by multiple data resources. For instance, in the case of word processing files, the data normalizer may convert the data into an ASCII format (American standard code for information interchange) and/or RTF (rich text format) which applies a standard set of numerical values to the letters of the alphabet, numbers as well as punctuation and other characters. It is to be understood that this word processing format represents a simplistic example of data normalization. Accordingly, the data normalizer may be employed to convert most any data type into a format comprehendible by disparate resources.

The classification framework engine 106 may automatically standardize and/or normalize the data in accordance with any preference, policy, rule, etc. imposed either by a user, system administrator, application or otherwise. For example, the classification framework engine 106 may standardize and/or normalize the data according to eXtensible Markup Language (XML) Data Encoding Specification for Intelligence Community (IC), including the Enterprise Data Header (EDH). The classification framework engine 106 may perform normalizing of the data before any processing of the data, and may also store a copy of original data in a database 104 before any processing of the unstructured data.

In some embodiments, the classification framework engine 106 may also initially parse the copies of data received from the multiple data source devices 102, which has been formatted based on a protocol, into a format that may be accepted by and presented on an analyst computer 108. A parsing technique executed by the classification framework engine 106 may include data capture, and a parsing module associated with the parsing technique may include dividing a copy of the data into multiple sections. Another parsing operation may include data capture, and parsing module further dividing header section of the data into various portions. In some embodiments, the parsing module may also correlate structured data and unstructured data to define a link between the structured data and the unstructured data of the overall data. The parsing module may then output the unstructured data and the structured data to a database 104 for temporary storage.

In some embodiments, a parsing module may transform structured data using any suitable application programs. For example, the parsing module may include a language translation software that translates extracted words and sentences in the data into another language. Another example is the integration of a spell check application that corrects spellings of extracted words from the data. The parsing module may additionally include a grammar check application that automatically corrects the grammar of extracted text from the data or include a natural language processing application that recognizes and transforms texts within the data into computer commands. Math applications may additionally be included to apply math operations on extracted number and/or equations within the data. In still another example, the parsing module may include data compression to encode the extracted data to a smaller size.

A classification framework engine 106 is further capable of converting the unstructured data (which may be tagged, parsed, normalized, and/or standardized) into a format, which captures the essence of the unstructured data. The essence of the unstructured data may correspond to true meaning of the unstructured data. The unstructured data may arrive in a variety of formats and encodings to the classification framework engine 106, which may implement different decoding procedures to decode the unstructured data received from the multiple data source devices 102. One or more decoding programs known in the art may be implemented on the encoded unstructured data received from the multiple data source devices 102 to decode the encoded unstructured data.

Figure 1B:
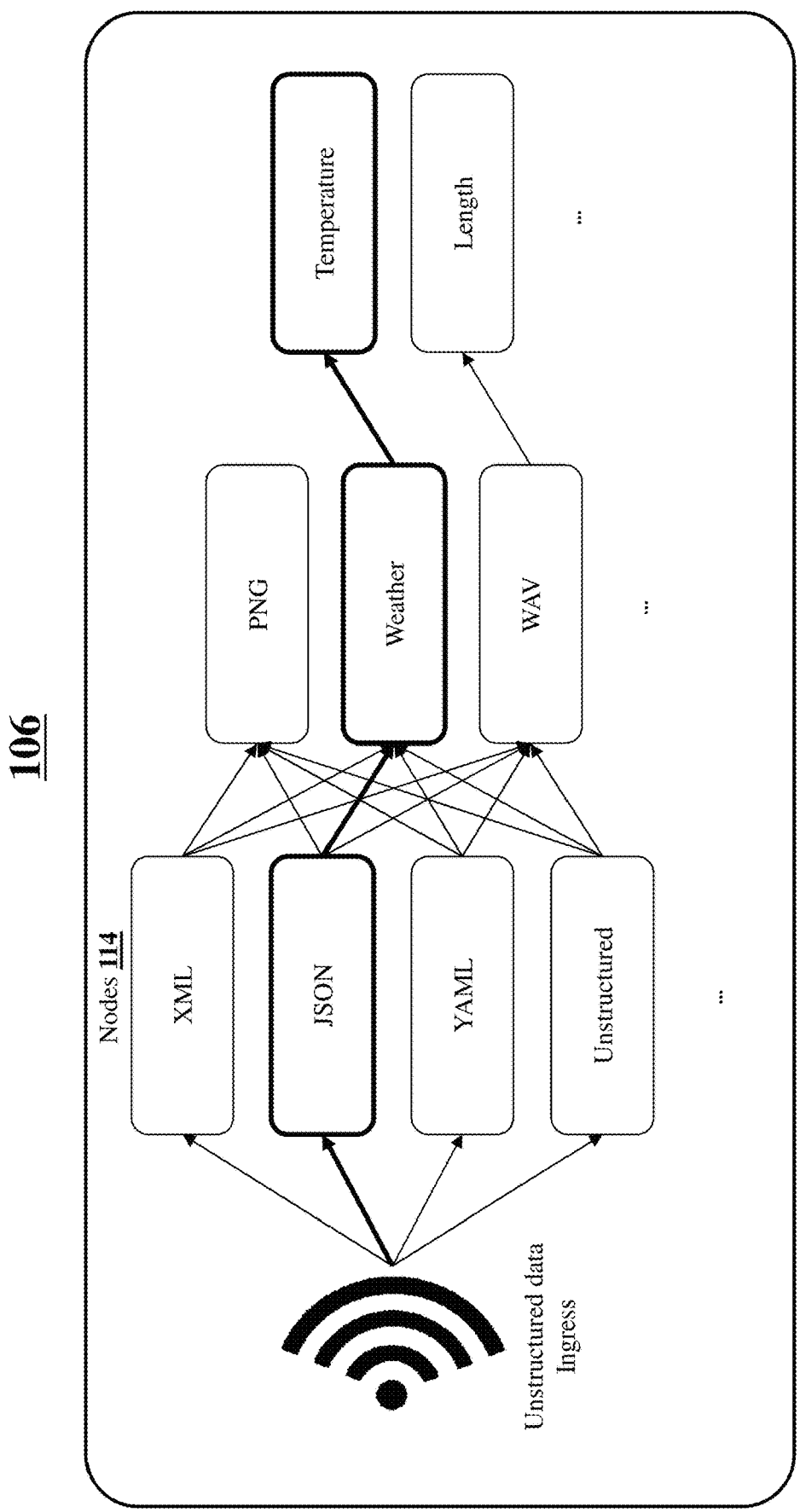
FIG. 1B illustrates an example of classification of data streams, according to an embodiment.

The classification framework engine 106 may further be configured to perform categorization of a plurality of data streams (comprising unstructured data or other type of data) received from the multiple data source devices 102 by executing one or more pattern matching programs. The pattern matching programs are utilized to map out incoming data streams and identify portions of the incoming data streams that match pre-determined patterns. Examples of pattern matching techniques include character matching techniques, imaging matching techniques, and the like. In some embodiments, the classification framework engine 106 may also be configured to perform branching of a plurality of data streams (comprising unstructured data or other type of data) received from the multiple data source devices 102 by executing one or more pattern matching programs. The categorization and/or branching of the plurality of data streams may result in generating multiple branches of the plurality of data streams, where each branch of the plurality of data streams is defined as a pattern, and the categorization and/or branching process executed by the classification framework engine 106 may propagate through each of the plurality of data streams, and subsequently lead to identification of increasingly specific patterns in all of the unstructured data contained in each of the plurality of data streams. A structure of the classification framework engine 106 is depicted in FIG. 1B, which defines one or more patterns in the unstructured data contained in the plurality of data streams to match on each node 114, while each edge of each node 114 points to increasingly specific patterns in the unstructured data contained in the plurality of data streams.

During operation, a classification framework engine 106 using one or more processors may also implement processing of data, such as unstructured data, received from multiple data source devices 102. A processor of the classification framework engine 106 may perform processing of the unstructured data received from the multiple data source devices 102 in multiple levels. For instance, the processor of the classification framework engine 106 may implement a first level of processing of the unstructured data received from the multiple data source devices 102. The first level of processing of the unstructured data may include the processor identifying input format of the unstructured data. In one embodiment, the processor may identify an input format of the unstructured data by analyzing one or more file extensions of the unstructured data. In another embodiment, the processor may identify the input format of the unstructured data by analyzing header content of the unstructured data. For example, a data pattern of the unstructured data representing data file headers, such as XML, may be among a list of top-level patterns to compare the incoming unstructured data against.

Upon determination of the input format of the unstructured data, the classification framework engine 106 via the one or more processors may then execute a comparison program/algorithm to compare the unstructured data against a list of characteristics, such as presence of an image, audio, or video header in the unstructured data. The classification framework engine 106 may compare the unstructured data against the list of characteristics, which may be listed in a form of a graph or a table as shown in the FIG. 1B, until data components corresponding to the list of characteristics are identified in the unstructured data. The processor may identify all of the data components in the unstructured data when a set of descriptive, atomic metrics are reached at the leaf vertices of the graph or the table, as shown in the FIG. 1B. The classification framework engine 106 may then generate a final output, which may contain a set of atomic level data points having a common attribute to identify exemplary data components in all of the unstructured data. The atomic level data points determined by the classification framework engine 106 may represent a core component of intermediate data representation 110 of the system 100. The intermediate data representation 110 captures the essence of the incoming unstructured data in a data source-agnostic way, with the intention of providing a set of comparable metrics to classify related data types in the incoming unstructured data.

An intermediate data representation 110 may be made up of a list of properties or metrics that may have been collected from a classification framework engine 106. The list of properties may accommodate any incoming unstructured data while still maintaining the essence of the unstructured data. Along with the list of properties, a path taken through the classification framework engine 106 for classification of the data may be stored as data in the intermediate data representation 110. In some embodiments, the intermediate data representation 110 may present a set of variables to compare with the incoming unstructured data. The intermediate data representation 110 may also present a logical framework for operating on data points within the incoming unstructured data, and making analytical processing of the unstructured data easier. Using information associated with the intermediate data representation 110, a model may be generated out of representative data. For example, a Support Vector Machine (SVM) clustering model 112, which is a non-linear model may be generated to capture non-linear dependencies among various attributes of the information associated with the intermediate data representation 110. The SVM clustering model 112 may be trained with training data, e.g., historical data associated with the intermediate data representation 110, in order to reflect salient attributes and behaviors of the phenomena being modeled. In the training process, sets of training data may be provided as inputs to the SVM clustering model 112, and the SVM clustering model 112 may output may be compared to corresponding sets of desired outputs. The resulting error is often used to adjust weights or coefficients in the SVM clustering model 112 until the SVM clustering model 112 generates the correct output (within some error margin) for each set of training data. The SVM clustering model 112 may be considered to be in training mode during the training process. After training, the SVM clustering model 112 may receive real-world data as inputs, and provide predictive output information which may be used to control or make decisions regarding the modeled phenomena. In operation, the SVM clustering model 112 may be used for clustering of the atomic level data points to generate a cluster of atomic level data points having a common attribute.

One advantage of a classification framework engine 106 may include enabling fast, extensible, flexible, and powerful generation of an agnostic intermediate data representation 110 that captures the essence of the incoming unstructured data, without having to account for the format of the unstructured data. The classification framework engine 106 may also operate as a highly extensible framework engine, and appropriately integrates within the architecture of system 100 for big data analysis. In an example, Apache Storm, which is a distributed stream processing computation framework written predominantly in the Clojure programming language, which is programming language with an emphasis on functional programming and runs on the Java virtual machine and the Common Language Runtime, may be leveraged to parallelize and distribute computational load across a large collection of data source devices 102, including virtual hardware architectures.

Analyst computer 108 may be computing devices that analysts may use to run data analysis and visualization tools. The analyst computer 108 may be any computing device comprising a processor and capable of performing the various tasks and processes described herein. Non-limiting examples of the analyst computer 108 may include laptops, desktops, servers, tablets, and smartphones. The analyst computer 108 may be coupled via one or more internal or external networks to other components of system 100.

The analyst computer 108 may include a graphical user interface and/or a display screen, which may comprise suitable logic, circuitry, interfaces, and/or code that may be operable to render the display screen presenting data analysis and visualization tools. The display screen may be realized through several technologies, such as, Cathode Ray Tube (CRT) based display, Liquid Crystal Display (LCD), Light Emitting Diode (LED) based display, Organic LED display technology, and Retina display technology. The display screen may be capable of receiving data from a classification framework engine 106, which may then be run through various data analysis and visualization tools. In some embodiments, the display screen may be a touch screen that enables an analyst to provide input in response to receiving any data from the classification framework engine 106. The touch screen may correspond to at least one of a resistive touch screen, a capacitive touch screen, or a thermal touch screen. In some embodiments, the display screen may receive input through a virtual keypad, a stylus, a gesture, and/or touch based input.

Software corresponding to data analysis and visualization executed by the analyst computer 108 permits an analyst to select output data from the classification framework engine 106 and/or the SVM clustering model 112, and then further process the output data for analysis and visualization on the GUI. In some implementations, an analyst computer 108 may have a GUI that allows an analyst to mark or tag output data presented as a cluster of atomic level data points with a common attribute. A cluster of atomic level data points in a record of the output data is then marked to reflect the tag inputted by the analyst computer 108. In some instances, the tag reflects an analyst's concern that the output data may contain data fields that have a common attribute. The analyst computer 108 or other device of the system 100 may perform various forms of processing on the output data, such as identifying which, if any, cluster of atomic level data points contain the same attributes in corresponding data point fields.

Databases 104 are hosted on a system 100, and are capable of storing data. The databases 104 may be in communication with a classification framework engine 106 and/or an SVM clustering model 112, where a processor associated with a classification framework engine 106 and/or the SVM clustering model 112 is capable of executing the various commands of the system 100. In some embodiments, the databases 104 may be part of the computer. In some embodiments, the databases 104 may be a separate component in communication with the computer.

The databases 104 include various sub-databases where each sub-database is configured to store data of certain types. These sub-databases may be in communication to each other via a network and include a non-transitory machine-readable storage media capable of receiving, storing, updating training datasets stored in the databases 104. The databases 104 may have a logical construct of data files that are stored in non-transitory machine-readable storage media, such as a hard disk or memory, controlled by software modules of a database program (for example, SQL), and a related database management system (DBMS) that executes the code modules (for example, SQL scripts) for various data queries and other management functions generated by the computer. The data stored in the databases 104 may include, for example, data streams and data stream formats and identification, parsing, and mapping rules.

A memory of the databases 104 may be a non-volatile storage device for storing threat information and/or corresponding alerts data and instructions, to be used by a processor of the computer. The memory may be implemented with a magnetic disk drive, an optical disk drive, a solid-state device, or an attachment to a network storage. The memory may include one or more memory devices to facilitate storage and manipulation of program code, set of instructions, tasks, data, PDKs, and the like. Non-limiting examples of memory implementations may include, but are not limited to, a random access memory (RAM), a read only memory (ROM), a hard disk drive (HDD), a secure digital (SD) card, a magneto-resistive read/write memory, an optical read/write memory, a cache memory, or a magnetic read/write memory.

A memory of databases 104 may be a temporary memory, meaning that a primary purpose of the memory is not long-term storage. Examples of the volatile memories may include dynamic random access memories (DRAM), static random access memories (SRAM), and other forms of volatile memories known in the art. In some embodiments, the memory may be configured to store larger amounts of information than volatile memory. The memory may further be configured for long-term storage of information. In some examples, the memory may include non-volatile storage elements. Examples of such non-volatile storage elements include magnetic hard discs, optical discs, floppy discs, flash memories, or forms of electrically programmable memories (EPROM) or electrically erasable and programmable (EE-PROM) memories.

Figure 2:
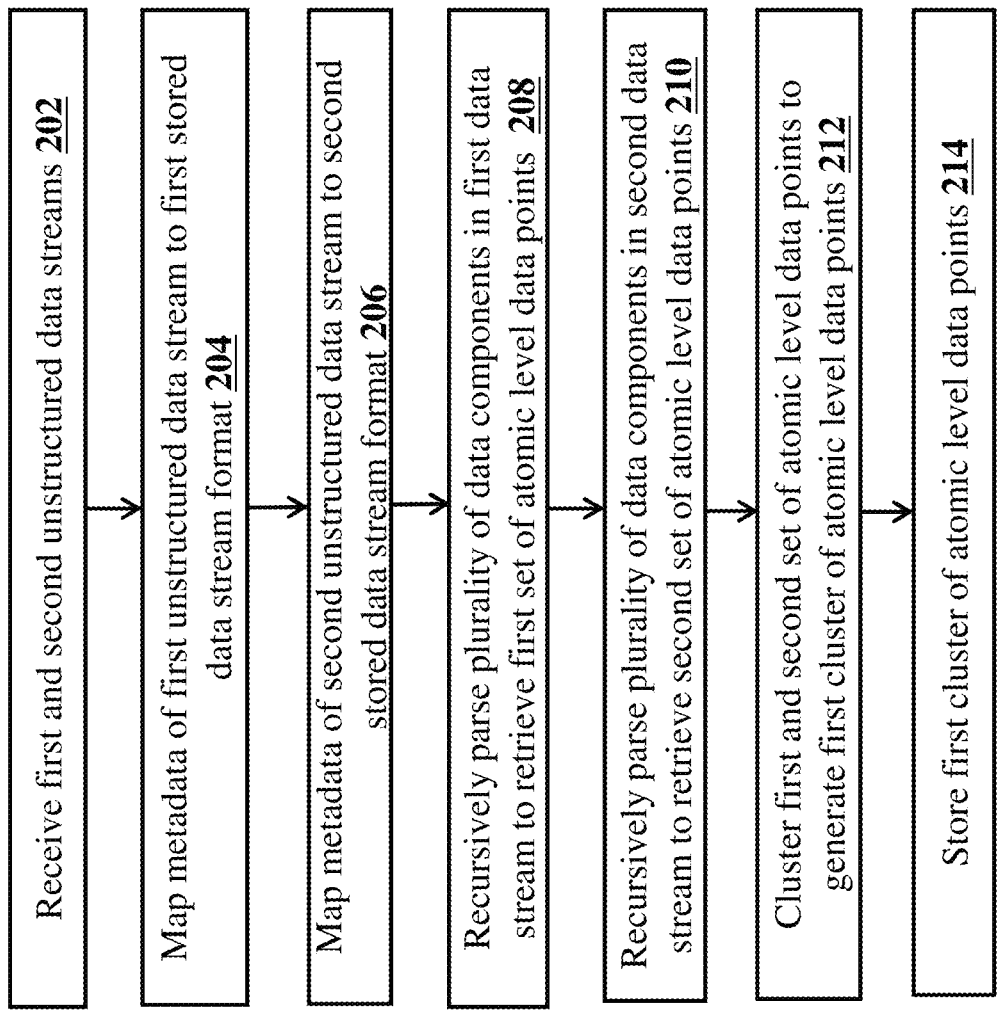
FIG. 2 illustrates a method for classification of ingest data, according to an embodiment.

FIG. 2 shows execution of a method for classification of ingest data, according to an exemplary method 200. The exemplary method 200 shown in FIG. 2 comprises execution steps 200, 204, 206, 208, 210, 212, and 214. However, it should be appreciated that other embodiments may comprise additional or alternative execution steps, or may omit one or more steps altogether. It should also be appreciated that other embodiments may perform certain execution steps in a different order; steps may also be performed simultaneously or near-simultaneously with one another. In addition, the exemplary method 200 of the FIG. 2 is described as being executed by a single computer in this exemplary embodiment. However, one having skill in the art will appreciate that, in some embodiments, steps may be executed by any number of computers operating in a distributed computing environment. In some cases, a computer executing one or more steps may be programmed to execute various other, unrelated features, where such computer does not need to be operating strictly as the computer described herein.

In a first step 202, a computer may receive unstructured data streams from multiple data sources. Examples of data sources running on data source devices may include, but are not limited to, content providers that supply information over a network, such as company websites, weather websites, Yahoo®, Google™, Twitter™, YouTube™, and news websites. The unstructured data generated by the data sources may be text or non-text, without a format or explicit dimensions or a data structure usable by a computer program on the data source devices.

In some embodiments, the computer may receive a first unstructured data stream from a first data source and a second unstructured data stream from a second data source. The first unstructured data stream may correspond to a first weather information data stream generated from a first weather information website such as https://www.accuweather.com/. The second unstructured data stream may correspond to a second weather information data stream generated from a second weather information website such as https://weather.com/. The first weather information data and the second weather information data may be unstructured data in a text form such as files, numbers, emails, blogs, reports, etc., and in a non-text form such as audio, video, images, etc.

The computer may format the first unstructured data stream and normalize the first unstructured data stream to generate a formatted and normalized first unstructured data stream. The computer may implement one or more formatting and/or normalization techniques on the first unstructured data stream to generate the formatted and normalized first unstructured data stream. The computer is also configured to perform formatting and/or normalization of the second unstructured data stream to generate a formatted and normalized second unstructured data stream. The computer may implement the one or more formatting and/or normalization techniques on the second unstructured data stream to generate the formatted and normalized second unstructured data stream.

In some embodiments, the computer may standardize the first and second unstructured data streams. For instance, the computer may run a controller compliant with industry standard web servers, which may access the first and the second unstructured data streams from first and second data sources containing unstructured data, stored in any format such as ASCII text, Unicode text, HTML, PDF text or PDF Image format. The controller, which may be a runtime execution module of the system, extracts data from the first and the second unstructured data streams, and interprets and standardizes the data. The controller may perform extraction, interpretation, and standardization of the first and the second unstructured data streams using a set of identification, parsing, and mapping rules, which may be stored in a database and are accessed by using a data access layer by the controller. The standardized first and second unstructured data stream, along with other application-specific data, are stored in the database. The extracted, interpreted, and standardized first and second unstructured data streams may be accessible to a user through the user interface.

In a next step 204, the computer may map metadata of the first unstructured data stream to a first stored data stream format based on a comparison of the metadata of the first unstructured data stream to a plurality of stored data stream formats. The plurality of stored data stream formats may number in the hundreds. The underlying metadata of the first unstructured data stream provides information on individual data objects, attributes, fields. The plurality of stored data stream formats may include, but is not limited to, at least XML (Extensible Markup Language), JSON (JavaScript Object Notation), and YAML (YAML Ain't Markup Language).

In some embodiments, the computer may map metadata of formatted and normalized first unstructured data stream to the first stored data stream format based on the comparison of the metadata of the formatted and normalized first unstructured data stream to the plurality of stored data stream formats. In some embodiments, the computer is configured to map metadata of standardized first unstructured data stream to the first stored data stream format based on the comparison of the metadata of the standardized first unstructured data stream to the plurality of stored data stream formats.

In a next step 206, a computer may map metadata of the second unstructured data stream to a second stored data stream format based on comparison of the metadata of the second unstructured data stream to the plurality of stored data stream formats. The plurality of stored data stream formats may number in the hundreds. The underlying metadata of the first unstructured data stream provides information on individual data objects, attributes, fields. The plurality of stored data stream formats may include, but is not limited to, at least XML, JSON, and YAML.

In some embodiments, the computer may map metadata of formatted and normalized second unstructured data stream to the second stored data stream format based on the comparison of the metadata of the formatted and normalized second unstructured data stream to the plurality of stored data stream formats. In some embodiments, the computer is configured to map metadata of standardized second unstructured data stream to the second stored data stream format based on the comparison of the metadata of the standardized second unstructured data stream to the plurality of stored data stream formats.

In a next step 208, a computer may recursively parse, based on the first stored data stream format, a plurality of data components in the first data stream to retrieve a first set of atomic level data points. The recursively parsing the plurality of data components in the first data stream may include first parsing the plurality of data components to identify a first set of intermediate atomic level data points, and then parsing the first set of intermediate atomic level data points to identify the first set of atomic level data points. The computer may terminate the recursive parsing of the plurality of data components in the first data stream when a termination criterion is met. The computer may determine the termination criterion is met when appropriate classification and categorization of the first data stream is completed.

In a next step 210, a computer may recursively parse based on the second stored data stream format, a plurality of data components in the second data stream to retrieve a second set of atomic level data points. The recursive parsing of the plurality of data components in the second data stream may include first parsing the plurality of data components to identify a second set of intermediate atomic level data points, and then parsing the second set of intermediate atomic level data points to identify the second set of atomic level data points. The computer may terminate the recursive parsing of the plurality of data components in the second data stream when a termination criterion is met. The computer may determine the termination criterion is met when appropriate classification and categorization of the second data stream is completed.

In a next step 212, a computer may cluster the first and second set of atomic level data points to generate a first cluster of atomic level data points with a common attribute. The computer may implement one or more clustering techniques and/or algorithms to cluster the first and second set of atomic level data points to generate the first cluster of atomic level data points with the common attribute.

In one embodiment, a computer may implement a hierarchical clustering algorithm to cluster the first and second set of atomic level data points to generate a first cluster of atomic level data points. The hierarchical clustering algorithm may be based upon a notion that the first and second set of atomic level data points closer in data space exhibit more similarity to each other than the first and second set of atomic level data points lying farther away. The hierarchical clustering algorithm may follow two approaches. In a first approach, the hierarchical clustering algorithm may start with classifying all of the first and second set of atomic level data points into separate clusters and then aggregating the separate clusters as the distance decreases. In a second approach, all of the first and second set of atomic level data points may be classified as a single cluster and then partitioned as the distance increases.

In another embodiment, a computer may implement a K-Means clustering algorithm to cluster the first and second set of atomic level data points to generate a first cluster of atomic level data points. The K-Means clustering algorithm is an iterative clustering algorithm in which a notion of similarity is derived by the closeness of a data point of the first and second set of atomic level data points to a centroid of the clusters. The K-Means clustering algorithm may run iteratively to find a local optimum.

In yet another embodiment, a computer may implement a distribution model algorithm to cluster the first and second set of atomic level data points to generate a first cluster of atomic level data points. The distribution model algorithm may be based on a notion of how probable is it that all of the first and second sets of atomic level data points in the cluster belong to a same distribution (For example: Normal, Gaussian). An example of the distribution model algorithm may be expectation-maximization algorithm, which may use multivariate normal distributions.

In yet another embodiment, a computer may implement a density model algorithm to cluster the first and second set of atomic level data points to generate a first cluster of atomic level data points. The density model algorithm may search the data space for areas of varied density of the first and second set of atomic level data points in a data space. The density model algorithm may isolate various different density regions and may assign the first and second set of atomic level data points within these regions in a same cluster. Examples of the density models may be DBSCAN and OPTICS.

In a next step 214, the computer may store the first cluster of atomic level data points based on the common attribute in a database. In some embodiments, the computer may transmit the first cluster of atomic level data points to an analyst computer. The analyst computer may be able to identify data metrics in the first cluster of atomic level data points based on identified patterns in the first cluster of atomic level data points. The analyst computer may automate the identification of patterns in the first cluster of atomic level data points through reverse regular expression generators. In some embodiments, the first cluster of atomic level data points may be displayed in form of an ingest framework graph, which may be visualized by analysts on a display screen of the analyst's computer.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer implemented method comprising:
receiving, by a computer, a first unstructured data stream from a first data source and a second unstructured data stream from a second data source;
mapping, by the computer, metadata of the first unstructured data stream to a first stored data stream format based on a comparison of the metadata of the first unstructured data stream to a plurality of stored data stream formats;
mapping, by the computer, metadata of the second unstructured data to a second stored data stream format of the metadata of the second unstructured data stream to the plurality of stored data stream formats;
recursively parsing, by the computer based on the first stored data stream format, a plurality of data components in the first data stream to retrieve a first set of atomic level data points;
recursively parsing, by the computer based on the second stored data stream format, a plurality of data components in the second data stream to retrieve a second set of atomic level data points;
clustering, by the computer, the first and second set of atomic level data points to generate a first cluster of atomic level data points with a common attribute; and
storing, by the computer, the first cluster of atomic level data points based on the common attribute in a database, such that data from the first and second data sources is accessed in a source-agnostic way.

2. The computer implemented method according to claim 1, wherein the first unstructured data stream correspond to a first weather information data stream generated from a first weather information website.

3. The computer implemented method according to claim 1, wherein the second unstructured data stream correspond to a second weather information data stream generated from a second weather information website.

4. The computer implemented method according to claim 1, further comprising formatting, by the computer, the first unstructured data stream to normalize the first unstructured data stream.

5. The computer implemented method according to claim 1, further comprising formatting, by the computer, the second unstructured data stream to normalize the second unstructured data stream.

6. The computer implemented method according to claim 1, wherein the plurality of stored data stream formats comprises at least XML (Extensible Markup Language), JSON (JavaScript Object Notation), and YAML (YAML Ain't Markup Language).

7. The computer implemented method according to claim 1, wherein recursively parsing the plurality of data components in the first data stream comprises first parsing the plurality of data components to identify a first set of intermediate atomic level data points and then parsing the first set of intermediate atomic level data points to identify the first set of atomic level data points.

8. The computer implemented method according to claim 1, wherein recursively parsing the plurality of data components in the second data stream comprises first parsing the plurality of data components to identify a second set of intermediate atomic level data points and then parsing the second set of intermediate atomic level data points to identify the second set of atomic level data points.

9. The computer implemented method according to claim 1, wherein the recursive parsing of the plurality of data components in the first data stream and the second data stream terminates when a termination criterion is met.

10. The computer implemented method according to claim 1, further comprising determining, by the computer, the termination criterion is met when the classification of the first data stream and the second data stream is completed.

11. A system comprising:
a non-transitory storage medium configured to store a database;
a processor configured to:
receive a first unstructured data stream from a first data source and a second unstructured data stream from a second data source;
map metadata of the first unstructured data stream to a first stored data stream format based on a comparison of the metadata of the first unstructured data stream to a plurality of stored data stream formats;
map metadata of the second unstructured data to a second stored data stream format of the metadata of the second unstructured data stream to the plurality of stored data stream formats;
recursively parse, based on the first stored data stream format, a plurality of data components in the first data stream to retrieve a first set of atomic level data points;
recursively parse based on the second stored data stream format, a plurality of data components in the second data stream to retrieve a second set of atomic level data points;
cluster the first and second set of atomic level data points to generate a first cluster of atomic level data points with a common attribute; and
store the first cluster of atomic level data points based on the common attribute in the database, such that data from the first and second data sources is accessed in a source-agnostic way.

12. The system according to claim 11, wherein the first unstructured data stream correspond to a first weather information data stream generated from a first weather information website.

13. The system according to claim 11, wherein the second unstructured data stream correspond to a second weather information data stream generated from a second weather information website.

14. The system according to claim 11, wherein the processor is further configured to format the first unstructured data stream to normalize the first unstructured data stream.

15. The system according to claim 11, wherein the processor is further configured to format the second unstructured data stream to normalize the second unstructured data stream.

16. The system according to claim 11, wherein the plurality of stored data stream formats comprises at least XML (Extensible Markup Language), JSON (JavaScript Object Notation), and YAML (YAML Ain't Markup Language).

17. The system according to claim 11, wherein recursively parsing the plurality of data components in the first data stream comprises first parsing the plurality of data components to identify a first set of intermediate atomic level data points and then parsing the first set of intermediate atomic level data points to identify the first set of atomic level data points.

18. The system according to claim 11, wherein recursively parsing the plurality of data components in the second data stream comprises first parsing the plurality of data components to identify a second set of intermediate atomic level data points and then parsing the second set of intermediate atomic level data points to identify the second set of atomic level data points.

19. The system according to claim 11, wherein the recursive parsing of the plurality of data components in the first data stream and the second data stream terminates when a termination criterion is met.

20. The system according to claim 11, wherein the processor is further configured to determine the termination criterion is met when the classification of the first data stream and the second data stream is completed.

* * * * *